US010979768B2

(12) United States Patent
Sarosi et al.

(10) Patent No.: US 10,979,768 B2
(45) Date of Patent: Apr. 13, 2021

(54) METHOD AND SYSTEM FOR DEVICE DISCOVERY AND CONTENT MANAGEMENT ON A NETWORK

(71) Applicant: Time Warner Cable Enterprises LLC, New York, NY (US)

(72) Inventors: George Sarosi, Niwot, CO (US); Jay Thomas, Denver, CO (US); William Helms, Longmont, CO (US); Chris Cholas, Frederick, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 15/043,371

(22) Filed: Feb. 12, 2016

(65) Prior Publication Data

US 2016/0277803 A1    Sep. 22, 2016

Related U.S. Application Data

(63) Continuation of application No. 13/769,140, filed on Feb. 15, 2013, now Pat. No. 9,264,751.

(51) Int. Cl.
*H04N 21/226* (2011.01)
*H04N 21/2389* (2011.01)
(Continued)

(52) U.S. Cl.
CPC ... *H04N 21/47202* (2013.01); *G06Q 30/0241* (2013.01); *H04L 67/02* (2013.01); *H04N 21/236* (2013.01); *H04N 21/254* (2013.01); *H04N 21/25866* (2013.01); *H04N 21/4122* (2013.01); *H04N 21/4622* (2013.01); *H04N 21/6125* (2013.01); *H04N 21/8586* (2013.01)

(58) Field of Classification Search
None
See application file for complete search history.

(56) References Cited

U.S. PATENT DOCUMENTS 7,602,820 B2    10/2009   Helms et al.
2002/0078161 A1*  6/2002  Cheng ............... H04L 12/2803
                                                    709/208

(Continued)

OTHER PUBLICATIONS

Digital Living Network Alliance (DLNA) Networked Device Interoperability Guidelines: Microsoft Extension: [MS-DLNHND]—v20130722; Jul. 22, 2013 (pp. 1-61).

*Primary Examiner* — Brian T Pendleton
*Assistant Examiner* — Jean D Saint Cyr
(74) *Attorney, Agent, or Firm* — Gazdzinski & Associates, PC

(57) ABSTRACT

Apparatus and methods for downloading selected multimedia content and applications. In one embodiment, the apparatus and methods enable various options or functionalities for programming content over a home network. A web-based user interface on a consumer device controls a set-top box (STB) over a local home network is utilized. An initial process connects the consumer device to an application server for the necessary web software. After discovery of both the consumer device and the STB on the local home network, an initial page of the application is loaded and the application calls the web services on the STB via the home network to retrieve data and control the STB with a compatible web browser on the consumer device.

20 Claims, 11 Drawing Sheets

(51) Int. Cl.

| | | |
|---|---|---|
| *H04N 21/234* | (2011.01) | |
| *H04N 21/266* | (2011.01) | |
| *H04N 21/41* | (2011.01) | |
| *H04N 21/472* | (2011.01) | |
| *H04N 21/258* | (2011.01) | |
| *H04N 21/254* | (2011.01) | |
| *G06Q 30/02* | (2012.01) | |
| *H04N 21/462* | (2011.01) | |
| *H04L 29/08* | (2006.01) | |
| *H04N 21/236* | (2011.01) | |
| *H04N 21/61* | (2011.01) | |
| *H04N 21/858* | (2011.01) | |

(56) References Cited

U.S. PATENT DOCUMENTS

| | | | |
|---|---|---|---|
| 2003/0056217 A1 | 3/2003 | Brooks | |
| 2006/0168159 A1* | 7/2006 | Weisman | H04L 29/06 709/220 |
| 2006/0184661 A1* | 8/2006 | Weisman | H04L 67/2823 709/224 |
| 2007/0237159 A1* | 10/2007 | Yamada | H04L 12/2834 370/395.53 |
| 2008/0313345 A1* | 12/2008 | Bernardin | G06F 9/505 709/235 |
| 2009/0064311 A1 | 3/2009 | Clark et al. | |
| 2009/0307307 A1* | 12/2009 | Igarashi | H04N 21/43615 709/203 |
| 2010/0035610 A1 | 2/2010 | Narang | |
| 2010/0070630 A1* | 3/2010 | Ding | H04L 67/02 709/224 |
| 2010/0165947 A1* | 7/2010 | Taniuchi | H04L 12/5692 370/331 |
| 2010/0219976 A1* | 9/2010 | Park | G08C 17/02 340/4.3 |
| 2011/0103374 A1 | 5/2011 | Lajoie et al. | |
| 2011/0124335 A1 | 5/2011 | Martin | |
| 2011/0191321 A1* | 8/2011 | Gade | G06F 12/08 707/709 |
| 2011/0270751 A1* | 11/2011 | Csinger | G06F 21/40 705/42 |
| 2012/0210379 A1* | 8/2012 | McCoy | H04N 21/25808 725/109 |
| 2012/0287452 A1 | 11/2012 | Tsujimoto | |
| 2012/0331096 A1 | 12/2012 | Yamaguchi et al. | |
| 2013/0136089 A1* | 5/2013 | Gillett | H04W 72/048 370/329 |
| 2013/0174223 A1* | 7/2013 | Dykeman | G06F 21/10 726/4 |
| 2013/0219010 A1* | 8/2013 | Mahendran | H04L 67/16 709/217 |
| 2013/0238426 A1* | 9/2013 | Mukhopadhyay | G06Q 30/02 705/14.49 |
| 2013/0266179 A1 | 10/2013 | Jin | |
| 2014/0282802 A1 | 9/2014 | Bowler | |
| 2015/0026740 A1* | 1/2015 | Poder | H04N 21/234309 725/93 |
| 2015/0327313 A1* | 11/2015 | Kim | H04W 80/10 370/329 |
| 2018/0351665 A1 | 12/2018 | Fukuta | |
| 2018/0375887 A1 | 12/2018 | Dezent | |

* cited by examiner

METHOD AND SYSTEM FOR DEVICE DISCOVERY AND CONTENT MANAGEMENT ON A NETWORK

This application is a continuation of and claims priority to U.S. patent application Ser. No. 13/769,140 filed on Feb. 15, 2013 of the same title, issuing as U.S. Pat. No. 9,264,751 on Feb. 16, 2016 and is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The disclosure relates generally to the fields of content and/or data delivery over a network. In one exemplary aspect, the disclosure is related to apparatus and methods for downloading selected multimedia content and applications that enable various options or functionalities for programming content over a home network.

2. Description of Related Technology

Recent advances in digital information processing and technology have made a broad range of services and functions available for delivery to consumers at their premises for very reasonable prices or subscription fees. Various methods of delivering media content such as video to end-users or consumers are known. For example, when the consumer requests television services (such as from a cable, satellite, or terrestrial network service provider), the service provider generally installs a host or terminal device, such as a set-top box (STB) or a gateway device configured to provide content to other devices in communication with the gateway (such as a wireless mobile device) that has access to the media content at the consumer's premises under a lease arrangement. Additionally, content may be provided to other consumer devices via communication of the service provider to entities in other networks. The service provider (e.g., multiple systems operator or MSO) delivers the content over the various channels subscribed by a particular user, as determined by a network or other content source, via the MSO distribution network and STB, or via other network configurations and entities as discussed above. Hence, the foregoing services may be provided and delivered to the user via a wide variety of different equipment environments including, inter cilia, cable modems, Wi-Fi™ hubs, WiMAX nodes, Ethernet hubs, gateways, switches and routers, computers, mobile user device, servers, cable or satellite networks and associated set-top boxes, and PSTNs.

These services and functions include digital content or programming (movies, etc.) delivered over digital video-on-demand (VOD), personal video recorder (PVR) and networked PVR (nPVR), Internet Protocol television (IPTV), digital media playback and recording, as well high speed Internet access and IP-based telephony (e.g., VoIP). Other services available to network users include access to, and recording of, digital music (e.g., MP3 files), as well local area networking (including wire-line and wireless local area networks) for distributing these services throughout the user's premises, and beyond. Network-delivered or network-based gaming and applications ("apps") have also each recently come to the forefront as popular content areas for subscribers.

The aforementioned STB or other MSO-provided devices accomplish video decoding, conditional access (CA) decryption, and display of a user interface. These STBs and devices however are often limited in processing power and memory, which makes it difficult for network operators to provide more full-featured services such as contemporary user interfaces, interactive program guides (IPGs), and interactive TV applications. Currently, STB user interfaces are typically provided by way of largely monolithic applications downloaded to each STB. Furthermore, two-way (or interactive) communications are limited to low-bandwidth commands and requests for on-demand sessions and video "trick mode" control, necessitating user content to be "carouselled" to each STB on a one-way broadcast network.

Network operators have been working on software solutions to overcome the aforementioned limitations on STBs and other Consumer Owned Devices (CODs). Enhanced Binary Interchange Format (EBIF), tru2way (based on the OpenCable Application Platform), CableCard, and other proprietary solutions have been deployed to create richer user interfaces, better on-screen guides, and interactive applications. Additionally, updated functionality in consumer electronic device technology has given MSOs the ability to explore delivering multimedia content in new ways. Smart TVs, STBs, PCs and mobile devices including smartphones and tablets/"phablets" now routinely include browser capability and can request on-demand content, connect to social networking services and engage in various interactive entertainment deployments.

However, many challenges remain in providing a seamless and user-friendly experience on any device at any time. Despite efforts to standardize digital video services, digital video is still typically provided via complex software downloaded on operator-leased devices, making it difficult to keep each such device up-to-date and capable of managing, viewing, recording, storing and sharing media content with a variety of peripheral devices and their ever-evolving operating systems. Furthermore, implementing interactive features without sacrificing network bandwidth and complying with content protection requirements has only made the task of providing video to a wide range of consumer devices more difficult.

The increased presence of home networking technologies in the average household affords network operators an emerging opportunity; i.e., to take advantage of the Internet and cloud-based applications in the context of digital video services. In particular, ubiquitous access to high-speed networks, robust browser implementation on all classes of electronic devices (including handhelds, tablets, and TVs), and widespread use of network tools (e.g., HTML5, CSS and Javaseript) would allow operators to make their distribution system compatible with non-leased devices and enable new implementations of the traditional operator applications by merging data and logic into the network for a far more interactive user experience. However, extant implementations of managed networks are currently not well suited to support service discovery and use by way of non-leased "consumer" electronic devices which are now ubiquitous with users, so as to provide enhanced integration and "seamlessness" of service.

Therefore, what is needed is a methodology and apparatus for enabling non-leased devices to discover services on a network so that features currently available only through leased operator devices can be replaced or supplemented with other delivery (e.g., web-based) technologies adapted for non-leased devices.

SUMMARY

The foregoing needs are addressed herein by disclosing, inter cilia, apparatus and methods for device discovery and content management on a network.

In a first aspect, a method for providing content between a first device and a second device on a network is disclosed. In one embodiment, the method includes: receiving an application at the first device from a first server, receiving a web-based user interface at the first device from a second server, discovering the second device on the network, requesting via the web-based user interface on the first device a programming action, and receiving at the first device content from the second device according to the requested programming action.

In one variant, the first device includes a browser application. In another variant, the first device includes a Smart TV, and the second device includes a leased device provided by a network operator, and the browser conforms to a CEA-2014-A standard.

In another variant, the first device includes a non-leased consumer device, and the second device includes a leased device.

In yet another variant, the act of receiving an application includes accessing the first server with a browser on the first device and downloading the application.

In a further variant, the act of receiving an application further includes executing the application, the application configured to redirect the browser to the second server.

In still another variant, the act of discovering includes obtaining from the application a first IP address associated with the first device, the performing a search based at least in part on the first IP address, and obtaining from the search a second IP address associated with the second device.

In yet a further variant, the performing a search includes performing a brute-force search of a subnet associated with the first IP address.

In another variant, the act of obtaining the first IP address includes use of a proprietary Javascript API associated with the first device.

In yet another variant, the act of performing a search function includes sending an HTTP request for known web services on a same subnet as the first IP address.

In a second aspect, a method for providing content to a first device associated with a premises network is disclosed. In one embodiment, the method includes: performing a discovery function, receiving at the first device a server universal resource location (URL) from a second device also associated with the network, loading a user interface into a browser on the first device using the server URL, selecting an option on the user interface, transmitting the selected option to the second device, and receiving content at the first device from the second device in accordance with the selected option.

In one variant, the act of performing a discovery function includes sending from the second device an advertisement of services on a standard port and address in the premises network, and sending from the first device a multicast search message on the standard port and address in the premises network.

In another variant, the act of receiving the server URL is accomplished using a Digital Living Network Alliance (DLNA) stack by an application running on the second device.

In a third aspect, a system adapted to manage media content within a premises network is disclosed. In one embodiment, the system includes: a first device configured to store the media content, a second device configured with a browser and a processor, the processor configured to run at least one computer program on the first device, the at least one computer program configured to, when executed: direct the browser to an application hosted on a server, receive a user interface from the application hosted on the server, obtain network information associated with the second device from the application hosted on the server, perform a search function, based at least in part on the network information, for devices on the same network as the second device, receive a reply to the search function, the reply comprising network information associated with the first device, and send messages using the network information associated with the first device and the user interface to control the media content stored on the first device.

In a fourth aspect, a non-transitory computer readable medium configured for use on a consumer device is disclosed. The computer readable medium has a plurality of instructions which are configured to, when executed: download a web application, the web application comprising at least a URL description, direct a web browser to a network server via the URL description, receive a user interface from the network server, and search known web services on the local area network (LAN) until a response message is received from a CPE on the LAN, access content on the CPE via the user interface.

In a fifth aspect, consumer premises equipment (CPE) adapted for connection to a content distribution network and for receipt of content via the network is disclosed. In one embodiment, the CPE includes a processor, a storage device in data communication with the processor, a computer readable medium configured to store a computer application thereon. In one variant, the computer application comprising a plurality of instructions which are configured to, when executed: discover at least one device on the LAN, receive control instructions from at least one device via web services on the CPE, receive content from the network, and transmit the content to the at least one device using at least a Digital Living Network Alliance (DLNA) protocol and a HyperText Transfer Protocol (HTTP).

In a further aspect of the disclosure, a method for accessing content via an Internet Protocol (IP)-enabled apparatus of a network is disclosed. In one embodiment, the IP-enabled apparatus includes an application computer program, and the method includes: (i) receiving, via the application computer program, a request to load a web-based user interface at an IP-enabled device in data communication with the IP-enabled apparatus, the interface implemented to enable accessing a network content storage apparatus; (ii) in response to receiving the request to load the web-based user interface, providing the web-based user interface on the IP-enabled device; (iii) receiving, via the web-based user interface, a request for content; (iv) causing access of the network content storage apparatus to obtain the content; and (v) providing the accessed content to the IP-enabled device.

In a further aspect of the disclosure, a non-transitory computer readable medium is disclosed. In one embodiment, the non-transitory computer readable medium includes at least one computer program having a plurality of computer readable instructions. In one variant, the plurality of computer readable instructions are implemented to, when executed on a network server apparatus: (i) maintain an application accessible to a browser via entry of a uniform resource locator (URL); (ii) provide a web page based user interface associated with the application; (iii) obtain network information associated with a network-based content storage apparatus; (iv) receive, via the web page based user interface, messages implemented to control media content stored on the network-based content storage apparatus; and (v) perform one or more operations on the media content stored on the network-based content storage apparatus in accordance with the received messages.

In yet a further aspect of the disclosure, a system for use in a content delivery network is disclosed. In one embodiment, the system includes: (i) a network server apparatus; and (ii) a networked media server apparatus. In one variant, the network server apparatus is implemented to, in response to a request from an Internet Protocol (IP)-enabled device: (i) generate a customized web application-based user interface for use by the IP-enabled device; and (ii) deliver the web application-based user interface to the Internet Protocol (IP)-enabled device for presentation to the user; and the networked media server apparatus is implemented to: (i) receive, via the web application-based user interface, messages implemented to control media content stored on the networked media server apparatus; and (ii) provide, via the web application-based user interface, media content from the networked media server apparatus in accordance with the received messages.

These and other aspects shall become apparent when considered in light of the disclosure provided herein.

DETAILED DESCRIPTION

Figure 1:
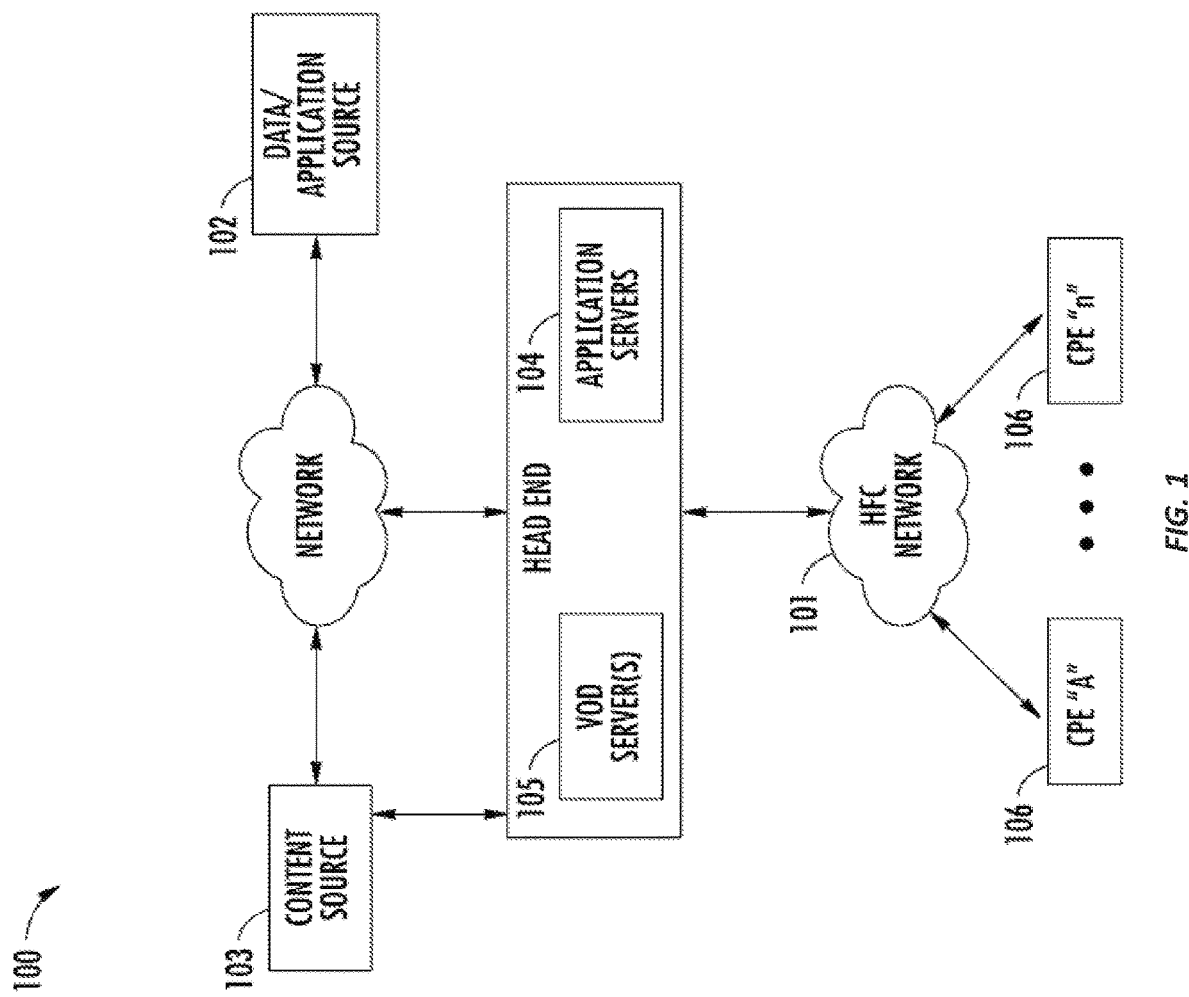
FIG. 1 is a functional block diagram illustrating an exemplary HFC cable network configuration useful with the various embodiments of the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-I (SMPTE standard 421 M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Consumer Premises Equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices, or combinations/integrations thereof. Display devices may also include less dynamic devices such as, for example, printers, e-ink devices, and the like.

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital"

cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "headend" refers generally to a networked system controlled by an operator (e.g., an MSO or multiple systems operator) that distributes programming to MSO clientele using client devices. Such programming may include literally any information source/receiver including, inter glia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, fiber to the home (FTTH), fiber to the curb (FTTC), satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RE cable, RE wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or 008, cable modem, etc.), Wi-Fi (802.11), WiMAX (802.16), PAN (e.g., 802.15), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers to either a group of service users (e.g. subscribers), or the resources shared by them in the form of for example entire cable RF signal, only the RF channels used to receive the service or otherwise treated as a single logical unit by the network for resource assignment.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A, analog cellular, CDPD, satellite systems, millimeter wave or microwave systems, acoustic, and infrared (i.e., IrDA).

Overview

In one salient aspect, methods and apparatus for downloading selected multimedia content and applications that enable various options or functionalities for programming content over a home network are disclosed. In one embodiment, a web browser is provided on a consumer device (e.g., smartphones, tablet, smartTV, etc.) and a STB is provided with an application using web technologies (e.g., HTML, CSS, Javascript, etc.) which, upon discovery of one another on the local network, enables a web-based user interface to be implemented on non-leased devices by merging STB software functionality into the network.

In the exemplary implementation, the STB is controlled with a Java application and an embedded webserver which exposes web services on the local home network. These services are used to control the functions of the STB and include methods to get the list of current recordings on the STB with metadata, schedule a recording or retrieve a list of linear services that might be available. The exemplary consumer device runs a compatible web browser and an application that is served from a web server from a cable network. Once the initial page of the application is loaded the application calls the web services on the STB via the home network to retrieve data and control the STB.

Detailed Description of Exemplary Embodiments

Exemplary embodiments of the apparatus and methods of the present disclosure are now described in detail. While these exemplary embodiments are described in the context of a hybrid fiber/coax (HFC) cable system architecture having a multiple systems operator (MSO), digital networking capability, IP delivery capability, and plurality of client devices/CPE, the general principles and advantages of the disclosure may be extended to other types of networks and architectures, whether broadband, narrowband, wired or wireless, managed or unmanaged, or otherwise, the following therefore being merely exemplary in nature. For example, the disclosure may be practiced over a fiber-to-the-home (FTTH) or fiber-to-the-curb (FTTC) system, HFCu networks, or over satellite or millimeter wave-based networks.

It will also be appreciated that while described generally in the context of a consumer (i.e., residential) end user domain, the various aspects of the present disclosure may be readily adapted to other types of environments (e.g., commercial/enterprise, government/military, etc.) as well. Myriad other applications are possible.

Other features and advantages will immediately be recognized by persons of ordinary skill in the art with reference to the attached drawings and detailed description of exemplary embodiments as given below.

Network—

FIG. 1 illustrates a typical content delivery network configuration with which the apparatus and methods of the present disclosure may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the disclosure. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
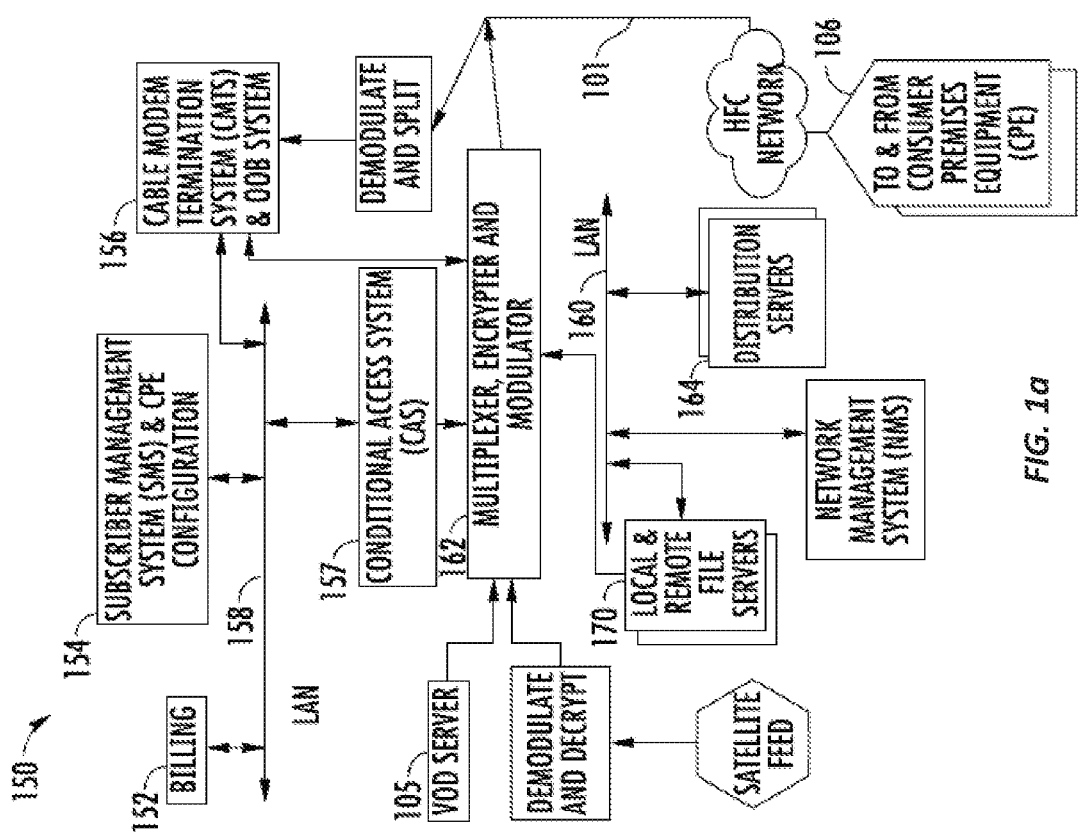
FIG. 1a is a functional block diagram illustrating one exemplary HFC cable network headend configuration useful with the various embodiments of the present invention.

Referring now to FIG. 1a, one exemplary embodiment of a headend architecture useful with the present disclosure is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture and that each MSO may have multiple headends deployed using custom architectures.

Figure 1B:
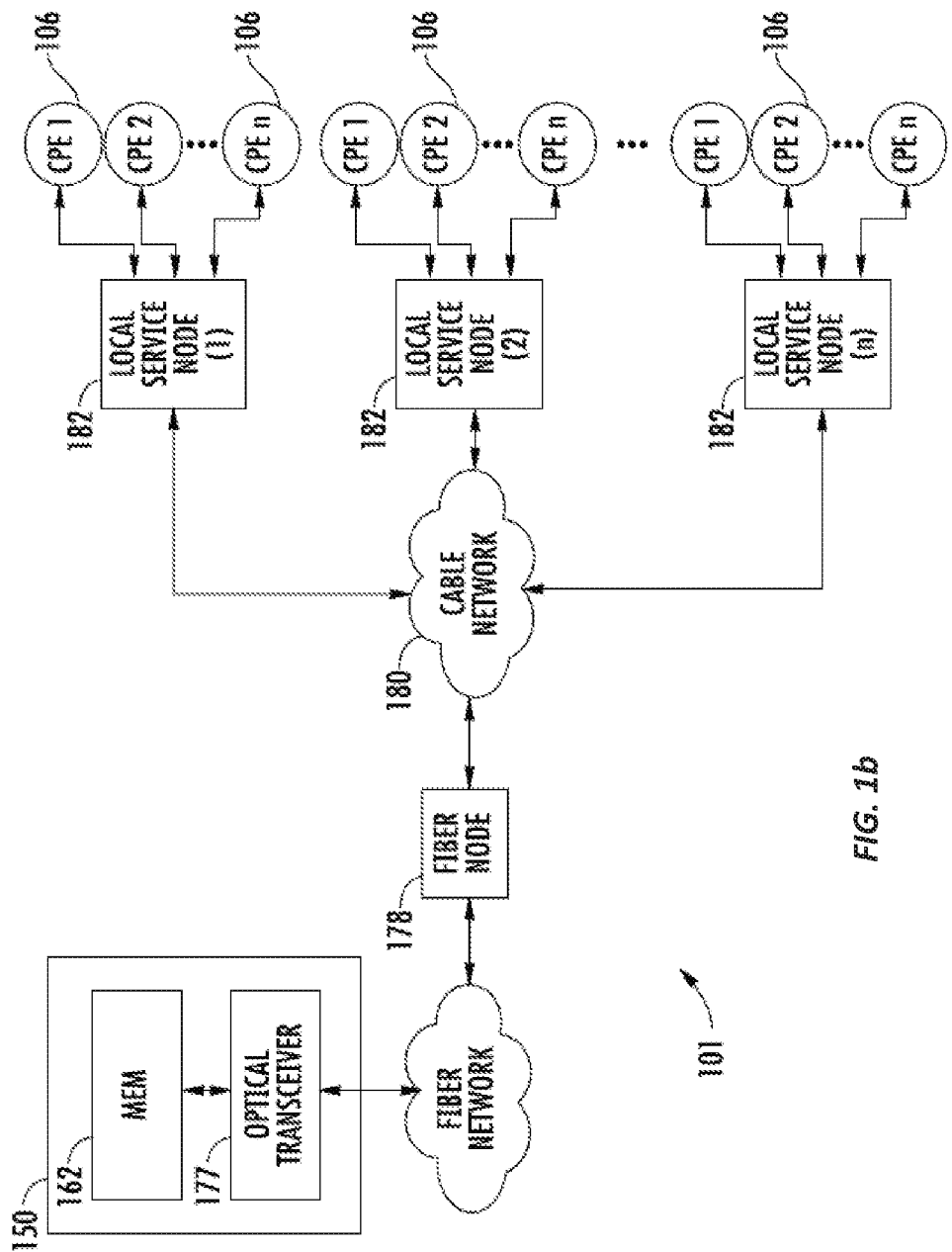
FIG. 1b is a functional block diagram illustrating one exemplary local service node configuration.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
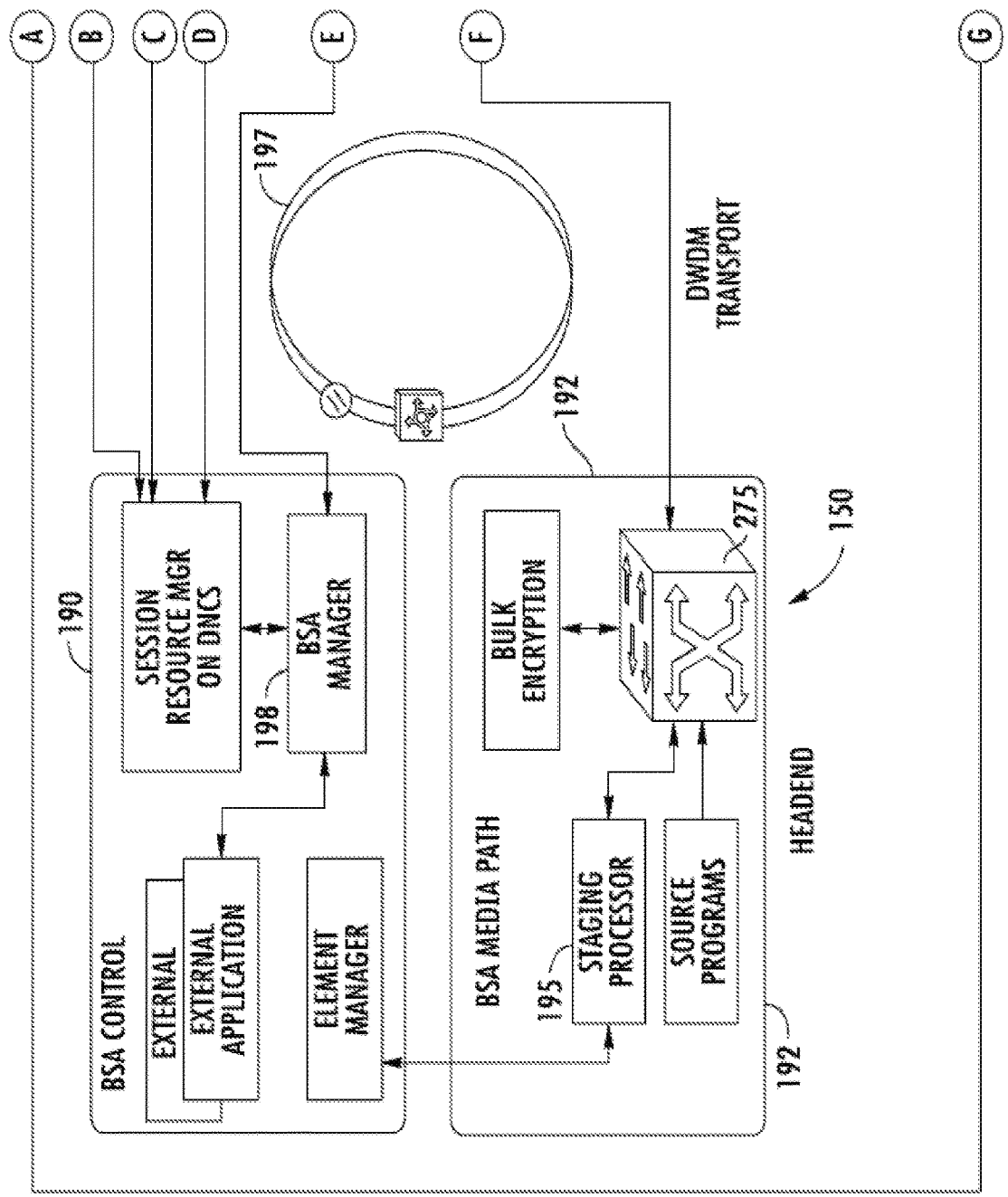
FIG. 1c is a functional block diagram illustrating one exemplary broadcast switched architecture (BSA) network.
Figure 1C:
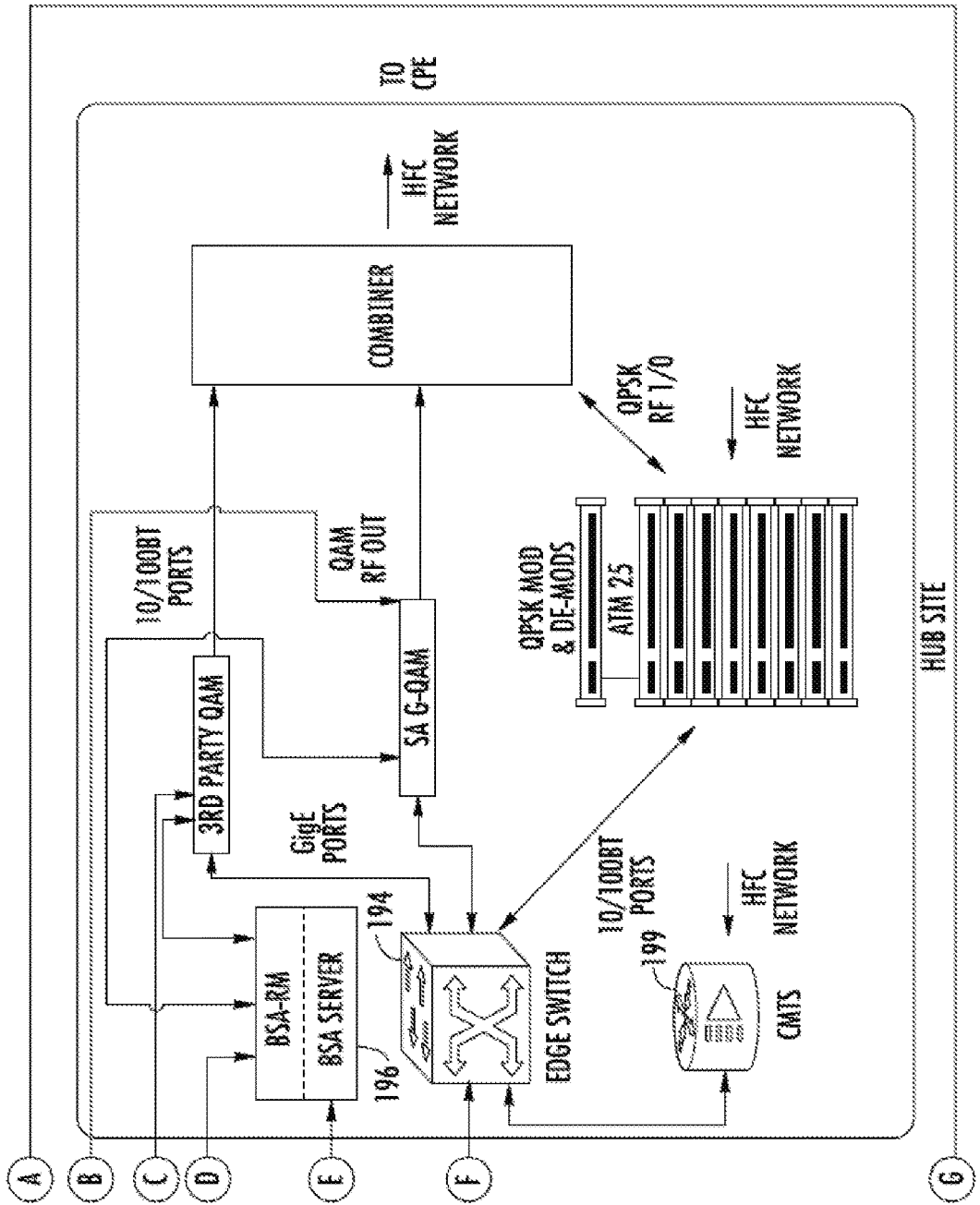

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. Pat. No. 7,602,820, issued Oct. 13, 2009 and entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the disclosure is in no way limited to these approaches.

"Switched" Networks—

FIG. 1c illustrates an exemplary "switched" network architecture also useful with the premises network device discovery methods and features of the present disclosure. While a so-called "broadcast switched architecture" or BSA network is illustrated in this exemplary embodiment, it will be recognized that the present disclosure is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture useful with the present disclosure, although it will be recognized by those of ordinary skill that other approaches and architectures may be substituted.

In addition to "broadcast" content (e.g., video programming), the systems of FIGS. 1a and 1c (and FIG. 1d, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

Figure 1D:
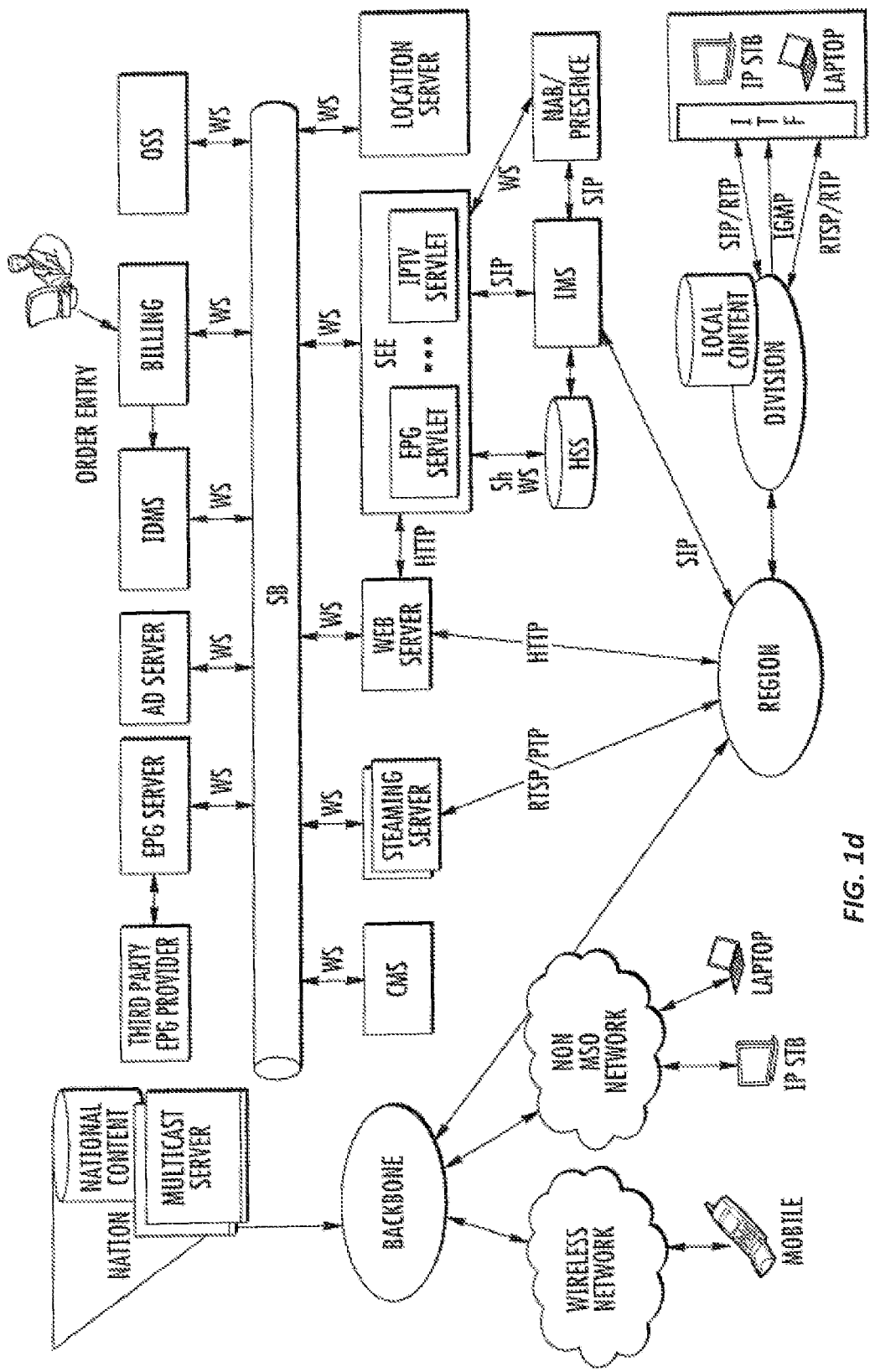
FIG. 1d is a functional block diagram illustrating one exemplary packetized content delivery network architecture.

"Packetized" Networks—While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. patent application Ser. No. 12/764,746 filed on Apr. 21, 2010 and entitled "METHODS AND APPARATUS FOR PACKETIZED CONTENT DELIVERY OVER A CONTENT DELIVERY NETWORK, incorporated herein by reference in its entirety. Such a network provides significant enhancements in terms of, inter alia, common control of different services, implementation and management of content delivery sessions according to unicast or multicast models, etc.; however, it is appreciated that the various features of the present disclosure are in no way limited to any of the foregoing architectures.

Architecture—

Figure 2:
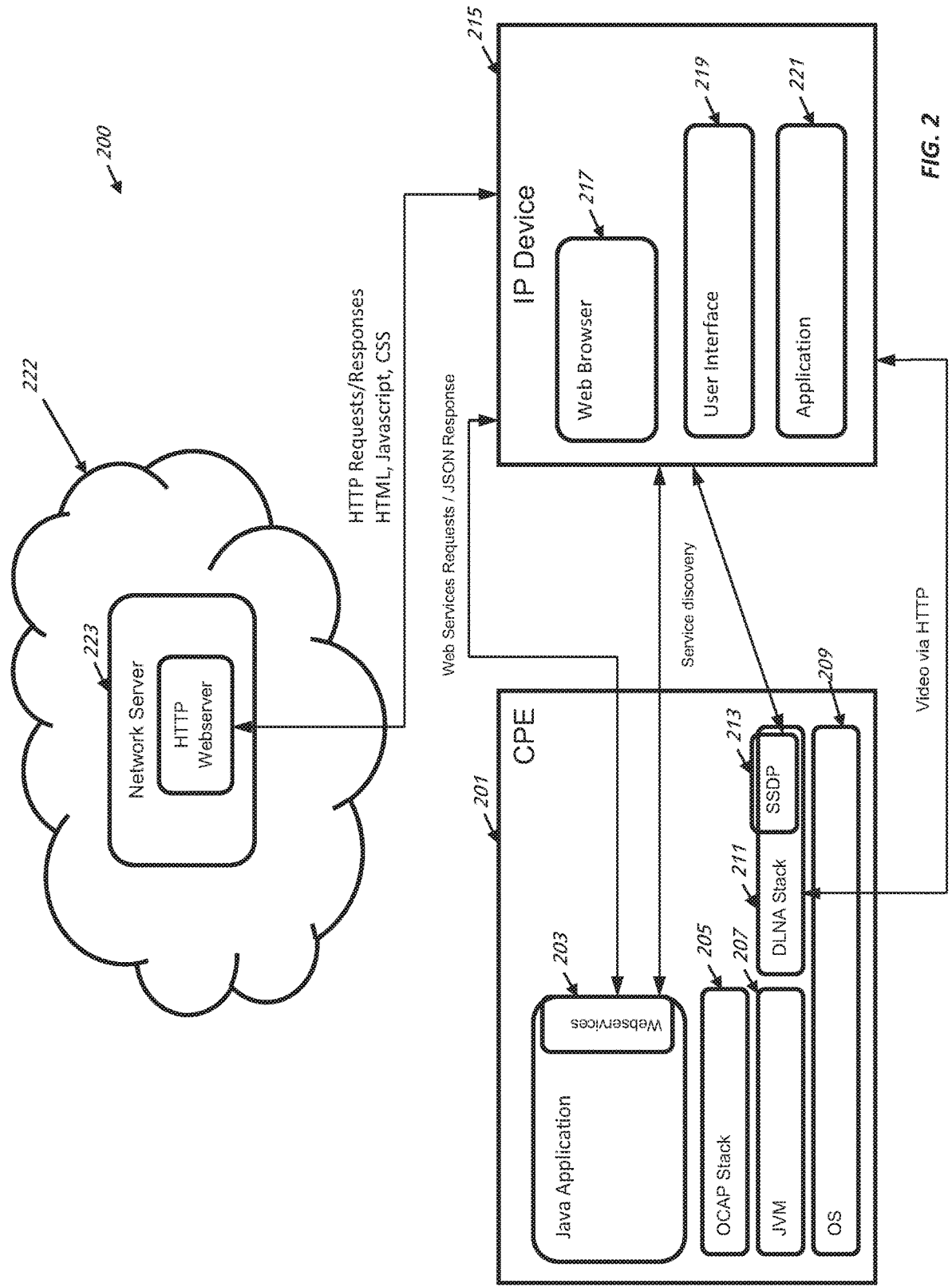
FIG. 2 is a functional block diagram illustrating one exemplary embodiment of a content delivery system for discovering network devices and managing media content according to the disclosure.

Referring now to FIG. 2, one exemplary embodiment of a content delivery architecture 200 for discovering network devices and managing media content according to the present disclosure is illustrated.

The CPE 201 shown in FIG. 2 is a digital terminal that is used to provide a variety of information and media content to a customer. The CPE 201 may take on any number of forms, including those with various types of wired and wireless interfaces, indigenous recording capabilities (e.g., DVR or MR-DVR capability), "trick mode" functionality etc. The CPE 201 may further comprise one or more digital processor(s), associated RAM, and a plurality of front/back end interfaces (e.g., video/audio interfaces, IEEE-1394 FireWire, Thunderbolt, USB, DisplayPort, serial/parallel ports, etc.) for interface with other end-user apparatus such as gateways, televisions, personal electronics, computers, Wi-Fi, WiMAX, or other network hubs/routers, etc.

In the illustrated embodiment, the CPE 201 of the reference architecture comprises media server functionality 203. The media server functionality may be rendered for example by a DLNA (Digital Living Network Alliance)-compliant digital media server (DMS) function 211 as discussed in DLNA interoperability Guidelines, version 1.5, published March 2006 (expanded October 2006), which is incorporated herein by reference in its entirety; however, other approaches may be used with equal success.

The exemplary CPE 201 of FIG. 2 may also be provided with an OCAP 1.0- or higher compliant application 205 and Java-based middleware built to run on a Java Virtual Machine 207 (JVM), which manages the operation of the device and applications running thereon. It will be recognized by those of ordinary skill that myriad different devices and software architectures may be used consistent with the functions of the present disclosure, the device of FIG. 2 being merely exemplary. For example, different middlewares (e.g., MHP, ARM, or ACAP) may be used in place of the OCAP middleware of the illustrated embodiment.

In one exemplary embodiment, the CPE 201 is controlled by a Java application using the OCAP platform, such as OCAP Digital Navigator (ODN). In this embodiment, a lightweight webserver is embedded inside of the Java application (e.g., ODN) and is used to expose a set of web services 203 on the local home network. In one instance, the web services are used to control the functions of the CPE 201, and include methods to obtain a list of current recordings on the CPE with metadata, schedule a recording, and/or retrieve a list of "linear" services available. The exemplary CPE 201 may further comprise DOCSIS 3.0 compatibility, client applications or processes which service EPG, graphical user interfaces, or other associated functions necessary to support the various services described herein.

The illustrated CPE 201 is also advantageously configured to interface with many different IP client device profiles such as the well known Apple iTouch™ and iPhone™ and iPad™ products, as well as others (e.g., Android™, PSP, Zune™, PS3 or XBOX 360™), and PC's, Smart TVs and laptops. It will be appreciated that other components and devices may be utilized with the CPE 201, the foregoing being merely illustrative.

The IP device 215 of FIG. 2 comprises a client device with a processor and client application 221 adapted to run thereon which, in one embodiment, is configured to receive, process and display content received from the CPE 201, network server 223, or other entity. This software application 221 may be configured to provide the user with the ability to interact with IP content received thereon, as well as perform additional functions associated with content delivery. For example, the client application 219 may support and enable web-browsing, video calling, device discovery and application downloads. The client application may also enable various user-based functions within the IP device, including display and user interactivity with the user interface (UI) 219. Various other user interface functionality, as will be discussed below, may also be provided via the client application. It will also be recognized that the device configuration shown is essentially for illustrative purposes, and various other configurations of the IP device 215 are consistent with other embodiments of the disclosure.

In one exemplary embodiment, the IP (client) device 215 may comprise remote user interface (RUI) functionality. The RUI functionality may include a Web4CE (CEA 2014) for Universal Plug and Play (UPnP) RUI as disclosed in CEA document number CEA-2014-A entitled "Web-based Protocol and Framework for Remote User Interface on UPnP Networks and the Internet (Web4CE)" published July 2007, and incorporated herein by reference in its entirety, although others may be used with equal success. A user may control a web browser 217 that conforms to CEA-2014-A, and which may also be compatible with HTML 4.1 or above, and able to request and receive certain data content to be displayed in a user interface display 219 on the IP device 215. The IP device 215 may provide one or more input interfaces that the user may use to manipulate the browsing and display of the device.

In one embodiment, the IP device 215 runs a web application that is served from the webserver 223 in the MSO's (e.g., cable) network 222 (aka, the "cloud"). The initial page of the application is loaded via DOCSIS and the application 221 calls the web services 203 on the CPE 201 via the premises network to retrieve data and control the CPE 201. The web application may be written with a variety of web technology tools, including but not limited to, HTML/CSS and Javascript.

The exemplary IP device 215 may further comprise DOCSIS 3.0 compatibility, client applications or processes which service EPG, graphical user interfaces, or other associated functions necessary to support the various services described herein. The IP device 215 may be any device consistent with the functionalities described herein, including for example, "smart" TVs, smartphones, PC's, laptops, tablets, phablets, etc. It will be appreciated that other components and devices may be utilized, the foregoing being merely illustrative.

In one embodiment, a network controlled, web-based navigational user interface 219 is delivered to a device, such as the IP device 215 of FIG. 2 (whether leased from the MSO, or obtained retail). This network controlled, web-based interface advantageously allows for rapid user personalization and customization, as well as service addition, replacement, and augmentation. It also permits the MSO a greater degree of control over the "look and feel" of the UI. Content made available to the user may be presented for example in the form of an electronic program guide (EPG) or other guide/interface having both MSO-based content and off-net content (e.g., internet content, uploaded user-originated content, etc.) listed therein. In one embodiment, the interfaces are made open to developers and MSO-partners in order to increase speed and ease of integration of new interfaces, services, applications, and functionality.

In one exemplary configuration, the user interface 219 is served to the IP device 215 from the network 223; i.e., the UI 219 is network-based versus CPE-based. This approach advantageously provides the ability for the network operator (e.g., MSO) to rapidly control and reconfigure the UI depending on the particular application, situation or use context (e.g., personal versus business, day versus night, etc.) or user (i.e., personalization). For instance, in one variant, a network server 223 disposed at the headend is used to preserve individual subscriber/account UI features and preferences. It can also maintain these features and preferences consistent across the population of devices associated with a given subscriber account or IP or other address (or even individual users within a multi-user account such as that of a family). This "theme" approach adds familiarity and ease of use for the individual user, in that their UI always appears the same (or substantially similar, within the limits of heterogeneous device capability; e.g., desktop versus mobile versus smart TV), and they do not have to remember or relearn the idiosyncrasies of each different device. Features such as "favorites", "friends/buddies", look-and-feel, menu or screen configurations, preferences, etc. can all be readily replicated and distributed across each of the user's platforms using the network-based UI approach of the illustrated embodiments herein.

The use of a server-based UI model also allows the MSO the opportunity to rapidly reconfigure each UI for new services, available content, or applications available to that particular user (or the subscriber pool as a whole). For example, where a new application is launched by the MSO, the supporting UI features (menus, icons, etc.) can be rapidly implemented and served to the various client devices without any service call or "truck roll". Moreover, the new application can be selectively applied to individual customers based on e.g., subscriber level, status of their bill payments, parental controls, etc.

The user interface 219 of the present disclosure may, in one embodiment, utilize web-based development and design which facilitates interactive information sharing, interoperability, user-centered design, and collaboration on the World Wide Web such as is categorized as "Web 2.0". Web 2.0 is a term commonly associated with web development/design that facilitates interactive information sharing, interoperability, user-centered design and collaboration on the Web. Some examples of Web 2.0 include web-based communities, web applications, social-networking sites, user video sharing sites, wikis, blogs, and mashups. For instance, a typical Web 2.0 site might allow its users to interact with others, or to change website content (versus non-interactive or static websites). In one instance, the IP device 215 may receive various forms of IP-based content to be presented to the user, including on-net content (e.g., video), Internet content, SMS/text, chat, e-mail, voice (e.g., VoIP), and access to applications and so-called "app stores." In this manner, various traditionally "PC" and smartphone applications may be accessible to the IP device 215.

Device Discovery Method—

One of the challenges of using a web browser as the user interface to a service is the discovery of the initial page of the application. Unlike a traditional browser used for web browsing, web browsers on many IP devices (e.g. a Smart TV) do not have an address bar for the user to type in the URL to the initial page of the application. Furthermore, the input device for some IP devices is a standard remote control that makes typing of a long URL string using a software keyboard difficult and tedious. The user is also required to remember or otherwise record the string of characters, which is not optimal.

Additionally, in order to provide users with a wide range of possible IP devices (which may or may not be leased) for use with a CPE, the MSO must provide a way for the IP device and the CPE to discover each other without the benefit of knowing beforehand information about the IP device or the home network that is ultimately deployed. To that end, the IP device requires discovery not only of the application server to receive the user interface, but also the address of the CPE in the home network that the IP device will control with the user interface. Two exemplary methods for discovering both a server and one or more network devices are discussed below.

Figure 3:
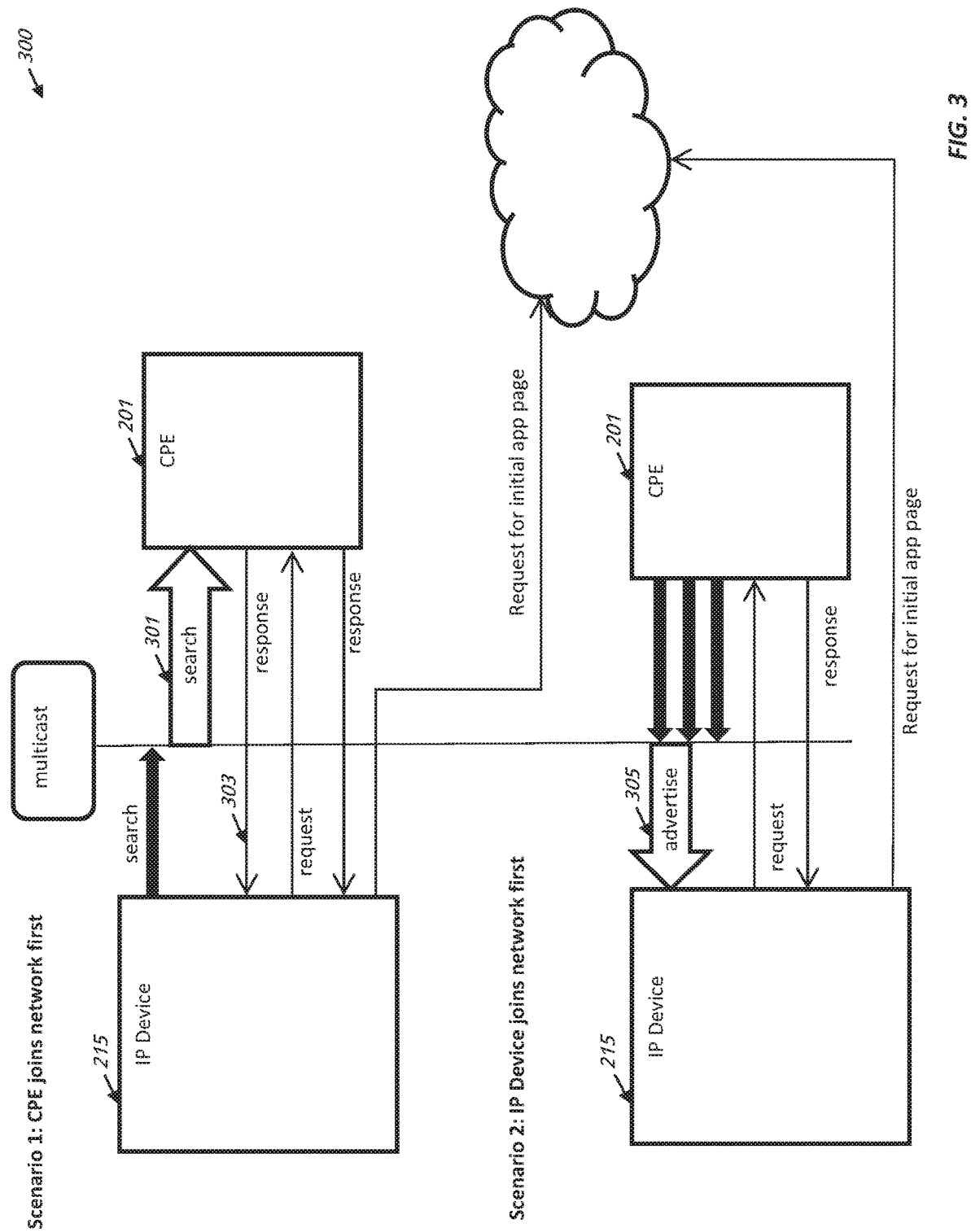
FIG. 3 is a block diagram illustrating two exemplary scenarios for discovering home network devices and accessing a network server.
Figure 4:
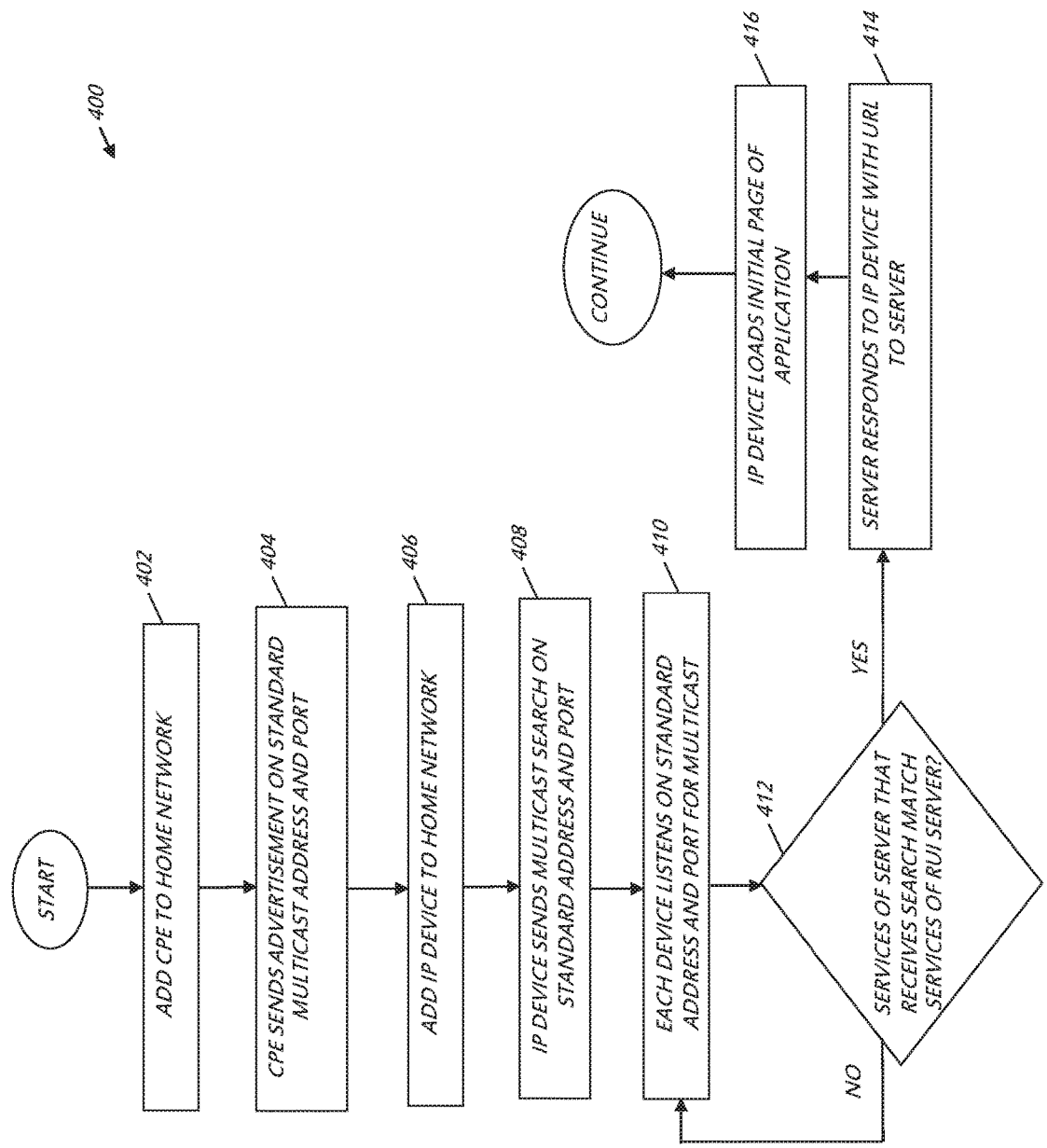
FIG. 4 is a flow diagram illustrating one exemplary embodiment of a method for accessing an application server and performing a search for additional devices on the network.

Referring now to FIGS. 3 and 4, exemplary methods for discovery of a network device are described. Specifically, FIG. 3 is a block diagram illustrating two exemplary scenarios for discovery of home network devices and accessing a network server according to the disclosure is shown. In the exemplary embodiment, both the IP device 215 and the CPE 201 support Simple Service Discovery Protocol (SSDP) for the RUI server discovery. As discussed above, the CEA-2014-A standard is a web-based protocol and framework for developing remote user interfaces which define a Remote User Interface (RUI) discovery protocol based on SSDP which is based on UPnP Device Architecture.

In scenario 1, the CPE 201 joins the network first. When the IP device 215 joins the network, it sends out a multicast search message to discover the CPE 201 on the network and initiate an exchange of messages that lead to the IP device requesting the initial page of an application hosted on a server. In scenario 2, the IP device joins the network first. When the CPE 201 is later added to the network it sends out an advertisement of its services. In one embodiment, the advertisement message contains a URL description of the server. The URL is provided to IP device 215 which then enables to request the initial page of an application hosted on the server.

FIG. 4 is a generalized flow diagram of one exemplary embodiment of a method 400 for the discovery of a network device in accordance with the block diagram in FIG. 3. In the illustrated implementation, both the IP device 215 and the CPE 201 support SSDP. The CPE 201 is deployed in a local network at step 402. The CPE 201 acts as a RUI server, and when added to the home LAN sends out an advertisement of its services per step 404 to a standard multicast address and port. It will be recognized that devices may be added to the network in any order, and that the order shown is but one example of the possible order of events. The IP device 215 performs as a RUI renderer and when added to the home network at step 406, it sends out a multicast search message 301 on the standard address and port at step 408. Per step 410, each device listens on the standard address and port for these multicast messages. For example, the devices might listen at standard address and port (239.255.255.250: 1900).

In the exemplary embodiments of FIG. 3 and FIG. 4, the search message 301 from the IP device 215 contains a search target field. If the services of the server that receives the search message matches the services provided by the server at step 412 of the method 400 of FIG. 4 (in this case the remote user interface server), the server will respond to the source IP (step 414), and the port that sent the request. The server's response will contain a URL to the description of the server and its services. The IP device 215 will read the description to obtain the URL to the initial page of the application (step 416). In one instance, the initial page of the application is hosted on a server in the MSO network, although other configurations can be used with equal success.

Referring again to FIG. 3, the advertisement message 305 from the CPE 201 (in scenario 2, where the IP device joins the network first) is very similar to the search response message 303 (in scenario 1 where the CPE joins the network first) and contains the URL to the description of the server and its services. The URL is provided to the DLNA/UPnP stack 211 by the application running on the CPE 201. The IP address of the CPE 201 is included in the URL as the query string. The IP device 215 reads the URL and loads the page into the browser 217. The web application 221 will then read the query string to retrieve the IP address of the CPE 201. At this point, both the operator network server and the CPE 201 have been discovered by the IP device 215, and the IP device 215 can then retrieve a web-based user interface from the network server and select options for controlling the web services on the CPE 201 (using the protocols discussed above). The browser in the IP device 215 defines an A/V Object that is used to play the video from the web application. Each recorded video asset and linear service has a unique URI or URL that is generated by the DLNA stack on the CPE, and is included in the data provided by the web services of the CPE 201.

Figure 5:
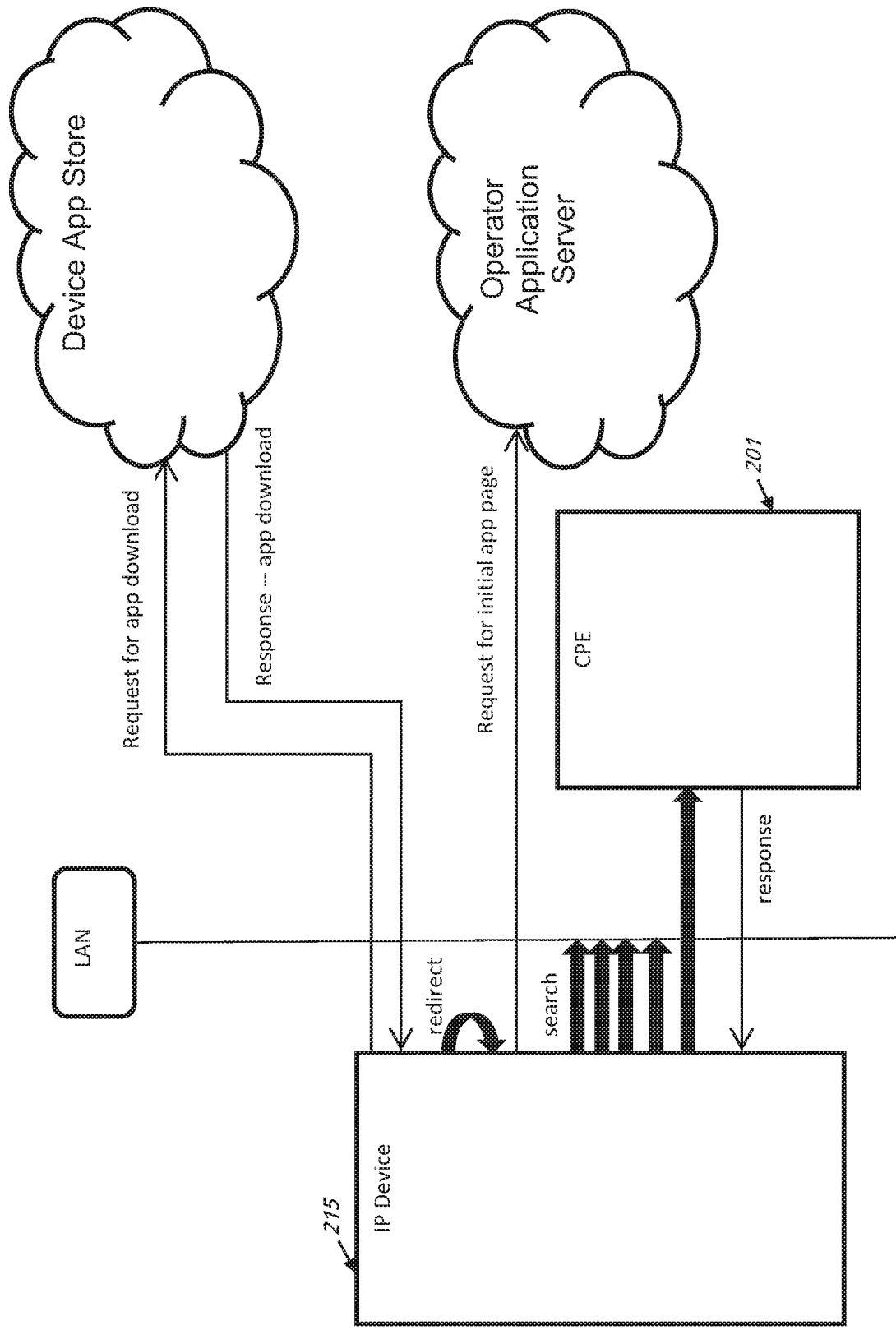
FIG. 5 is a block diagram illustrating one scenario for accessing an application server and performing a search for additional devices on the network.
Figure 6:
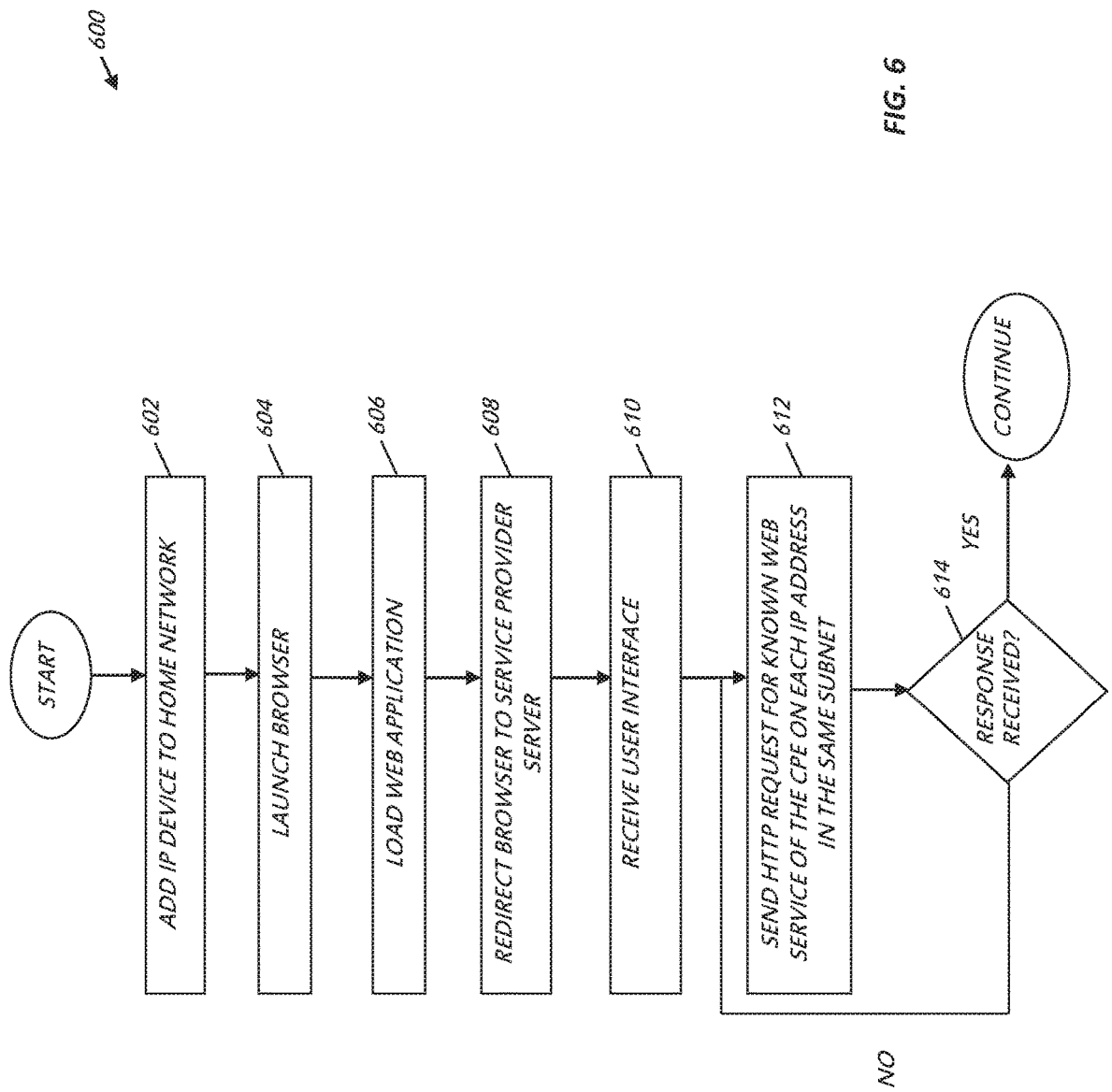
FIG. 6 is a flow diagram illustrating an exemplary embodiment of a method for accessing an application server and performing a search for additional devices on the network.

Referring now to FIGS. 5 and 6, methods for discovery of an application server according to one embodiment of the disclosure are described. The IP device 215 supports an "app store" functionality that allows a web application to be loaded from a server into the IP device 215, and then launched into the browser. In one instance, the initial page is defined using the device manufacturer's proprietary mechanism. The app store configuration has the initial page loaded via the app store at step 606, and then redirects the browser to the initial page of the application hosted on a server in the network per step 608. This process completes the application server discovery, but the application still needs the IP address of the CPE in the home network. Since the SSDP mechanism is not accessible at the application Javascript level, the application must use an alternative method to find the CPE 201. In the exemplary embodiment, the application uses a manufacturer's proprietary Javascript API to obtain the address of the IP device 215. The application then initiates a "brute force" search of all the IP addresses in the same subnet as the IP device 215 (step 612). In one instance, the search is accomplished by sending a HTTP request to a known web service of the CPE 201 on each IP address within the subnet until a response is received at step 614. The response message contains the IP address of the CPE 201, which then enables video to be sent from the CPE 201 to the IP device 215 using HTTP and the DLNA protocols. The browser in the IP device 215 defines an A/V Object that is used to play the video from the web application. Each recorded video asset and linear service has a unique URL that is generated by the DLNA stack on the CPE and is included in the data provided by the web services of the CPE 201.

It will be recognized that while certain aspects of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claims herein.

While the above detailed description has shown, described, and pointed out novel features of the disclosure as applied to various embodiments, it will be understood that various omissions, substitutions, and changes in the form and details of the device or process illustrated may be made by those skilled in the art. The foregoing description is of the best mode presently contemplated of. This description is in no way meant to be limiting, but rather should be taken as illustrative of the general principles of the disclosure. The scope of the disclosure should be determined with reference to the claims.

What is claimed is:

1. Computer readable apparatus comprising a non-transitory storage medium, the non-transitory storage medium comprising at least one computer program having a plurality of instructions, the plurality of instructions configured to, when executed by a processing apparatus, cause a computerized premises device to:
   transmit an advertisement message to a standard multicast address and port, the advertisement message comprising a uniform resource locator (URL) description, the URL description comprising at least a description of a network server apparatus of a network, the description of the network server apparatus configured to enable a computerized Internet Protocol (IP)-enabled device to request, from the network server apparatus, a webpage of a computer application hosted on the network server apparatus;
   receive, from the computerized IP-enabled device and via the webpage, one or more messages configured to control digitally rendered content; and
   perform one or more operations on the digitally rendered content in accordance with the received one or more messages;
   wherein the network server apparatus is disposed within a core portion of the network.

2. The computer readable apparatus of claim 1, wherein the performance of the one or more operations on the digitally rendered content comprises performance of a trick mode command on the digitally rendered content.

3. The computer readable apparatus of claim 1, wherein the performance of the one or more operations on the digitally rendered content comprises scheduling a recordation of the digitally rendered content.

4. The computer readable apparatus of claim 1, wherein:
   the network comprises a managed content delivery network;
   the computerized premises device comprises a leased device provided by the managed network;
   the computerized IP-enabled device comprises a non-leased smart television; and
   the computer readable apparatus enables the non-leased smart television to discover one or more services on the managed content delivery network such that features currently available only through the leased device or other leased devices can be replaced or supplemented with delivery technologies adapted for at least the non-leased smart television.

5. The computer readable apparatus of claim 1, wherein:
   the plurality of instructions are further configured to, when executed by a processing apparatus, cause the computerized premises device to monitor the standard port and address for a multicast search message sent from the computerized IP-enabled device; and
   wherein the transmission of the advertisement message occurs when the multicast search message is received at the standard port and address.

6. A system for use in one or more networks, the system comprising:
   a computerized Internet Protocol (IP)-enabled client device in data communication with a premises network, the computerized IP-enabled client device comprising at least one first computer program and a first processing apparatus, the at least one first computer program comprising a plurality of instructions, the plurality of instructions configured to, when executed by the first processing apparatus, cause the computerized IP-enabled client device to:
   transmit a multicast search message on a standard multicast port and address in the premises network;
   a computerized premises device of the premises network comprising at least one second computer program and second processing apparatus, the at least one second computer program comprising a plurality of instructions, the plurality of instructions configured to, when executed by the second processing apparatus, cause the computerized premises device to:
   advertise one or more services of the computerized premises device to the standard multicast port and address; and
   based at least on a match between one or more services of a computerized network server apparatus that receives the multicast search message and the one or more services of the computerized premises device, transmit a uniform resource locator (URL) description to the computerized IP-enabled client device; and
   the computerized network server apparatus, the computerized network server apparatus (i) disposed within a core portion of a managed content delivery network, and (ii) configured to:
   generate a web application-based user interface for use by the computerized IP-enabled device; and
   based at least on receipt of the URL description by the computerized IP-enabled client device, deliver the web application-based user interface to the computerized IP-enabled device for rendering thereon;
   wherein the URL description is configured to enable the computerized IP-enabled client device to receive the web application-based user interface from the computerized network server apparatus.

7. The system of claim 6, wherein said receipt of the URL description by the computerized IP-enabled client device is effected via use of a Digital Living Network Alliance (DLNA) computerized software stack by a computer program application running on the computerized IP-enabled client device.

8. The system of claim 6, wherein the URL description comprises at least a description of the computerized network server apparatus and one or more services provided thereby.

9. The system of claim 6, wherein the multicast search message comprises a search target field utilized in a determination of the match between the one or more services of the computerized network server apparatus that receives the multicast search message and the one or more services of the computerized premises device.

10. The system of claim 6, further comprising a computerized media server apparatus configured to:
receive, via the web application-based user interface, one or more messages configured to control digitally rendered media content stored on the computerized media server apparatus; and
provide, via the web application-based user interface, the digitally rendered media content from the computerized media server apparatus in accordance with the received one or more messages.

11. The system of claim 6, wherein the computerized network server apparatus is configured to customize the web application-based user interface based at least partly on preferences of a user associated with the computerized IP-enabled device.

12. The system of claim 6, wherein the computerized network server apparatus is configured to customize the web application-based user interface based at least partly on one or more subscriber account features associated with the computerized IP-enabled device or a user thereof, the one or more subscriber account features comprising a subscription level.

13. The system of claim 6, wherein the computerized network server apparatus is configured to customize the web application-based user interface based at least partly on a particular use context, the particular use context relating to at least a time of day.

14. The system of claim 6, wherein each of the computerized IP-enabled client device and the computerized premises device support Simple Service Discovery Protocol (SSDP) for discovery of the computerized network server apparatus.

15. A computerized method for operating an Internet Protocol (IP)-enabled computerized device within a network, the IP-enabled computerized device comprising an application computer program, the computerized method comprising:
transmitting a multicast search message on a multicast port and address;
based at least on a correlation between one or more services of a server apparatus that receives the multicast search message and one or more services of a computerized premises device, the one or more services of the computerized premises device indicated in an advertised message to the multicast port and address, receiving a uniform resource locator (URL) from the computerized premises device; and
utilizing said URL to load a webpage of a computer program application hosted on the server apparatus, the webpage configured to enable the IP-enabled computerized device control one or more functions of the computer premises device;
wherein the server apparatus is disposed within a core portion of the network.

16. The computerized method of claim 15, further comprising monitoring the address and port at least until the advertised message is received thereat.

17. The computerized method of claim 15, further comprising receiving data indicative of a plurality of digitally rendered content stored on the computerized premises device, the plurality of digitally rendered content comprising content affirmatively identified as a favorite by a user of the IP-enabled computerized device.

18. The computerized method of claim 15, wherein the one or more functions comprise one or more playback control operations, and the computerized method further comprises:
transmitting data relating to a selection of one or more playback control operations via the at least the webpage; and
receiving digitally rendered content from the computerized premises device in accordance with the selected one or more playback control operations.

19. The computerized method of claim 15, further comprising:
transmitting, via the webpage, data relating to a command to schedule a recordation of digitally rendered programming content, the command configured to cause the recordation of the digitally rendered programming content at a scheduled time, the recordation comprising storing the recorded digitally rendered programming content at the computerized premises device.

20. The computerized method of claim 15, further comprising causing, via the webpage, a lightweight web server apparatus of the computerized premises device to expose a plurality of web services on a local network in order to enable the control of the one or more functions of the computerized premises device, wherein the lightweight webserver apparatus is embedded inside of an object-oriented application computer program of the computerized premises device.

* * * * *